United States Patent [19]

Doden

[11] 4,193,707
[45] Mar. 18, 1980

[54] AXIAL BALL AND SOCKET JOINT

[75] Inventor: Hans-Jürgen Doden, Lemförde, Fed. Rep. of Germany

[73] Assignee: Lemförder Metallwaren AG, Fed. Rep. of Germany

[21] Appl. No.: 892,071

[22] Filed: Mar. 31, 1978

[30] Foreign Application Priority Data

Apr. 28, 1977 [DE] Fed. Rep. of Germany ... 7713390[U]

[51] Int. Cl.² .......................... F16C 11/00; F16D 1/12
[52] U.S. Cl. .................................... 403/140; 403/133; 403/135
[58] Field of Search .................... 403/56, 66, 76, 77, 403/123, 124, 125, 133, 135, 127, 140

[56] References Cited

U.S. PATENT DOCUMENTS

| | | | |
|---|---|---|---|
| 3,149,855 | 9/1964 | Adloff | 403/125 |
| 3,240,516 | 3/1966 | Barish | 403/56 |
| 3,414,302 | 12/1968 | Priest | 403/125 |
| 3,791,457 | 2/1974 | Hanser | 403/125 |
| 3,849,009 | 11/1974 | Bourdon | 403/133 |
| 3,967,907 | 7/1976 | Schmidt | 403/125 |
| 4,092,078 | 5/1978 | Klotz | 403/133 |

*Primary Examiner*—Charles J. Myhre
*Assistant Examiner*—R. C. Turner
*Attorney, Agent, or Firm*—McGlew and Tuttle

[57] ABSTRACT

An axial ball and socket joint particularly for steering suspensions of motor vehicles comprises a joint housing which has a first opening at one end and an opposite second opening at the opposite end and an interior surface which is at least partially spherical. A joint pin extends through the first opening and has a spherical ball head disposed within the housing and is journalled on a socket of elastic plastic for universal pivotal movement in the housing. The housing has a rim edge adjacent the second opening extending outwardly from the spherical surface with an inturned edge forming a ledge or underface which is partially spherical and is opposite to and spaced from the ball head. A connecting screw extends into the interior of the housing through the second opening and has a shank portion and a head portion connected to the shank portion which is larger than the shank portion and has a spherically curved intermediate portion disposed between the head portion and the shank portion which bears against the spherical curved interior ledge portion. The head portion has an exterior face disposed toward the ball head with a partially concave spherical recess which is engageable on the surface of the ball head.

4 Claims, 1 Drawing Figure

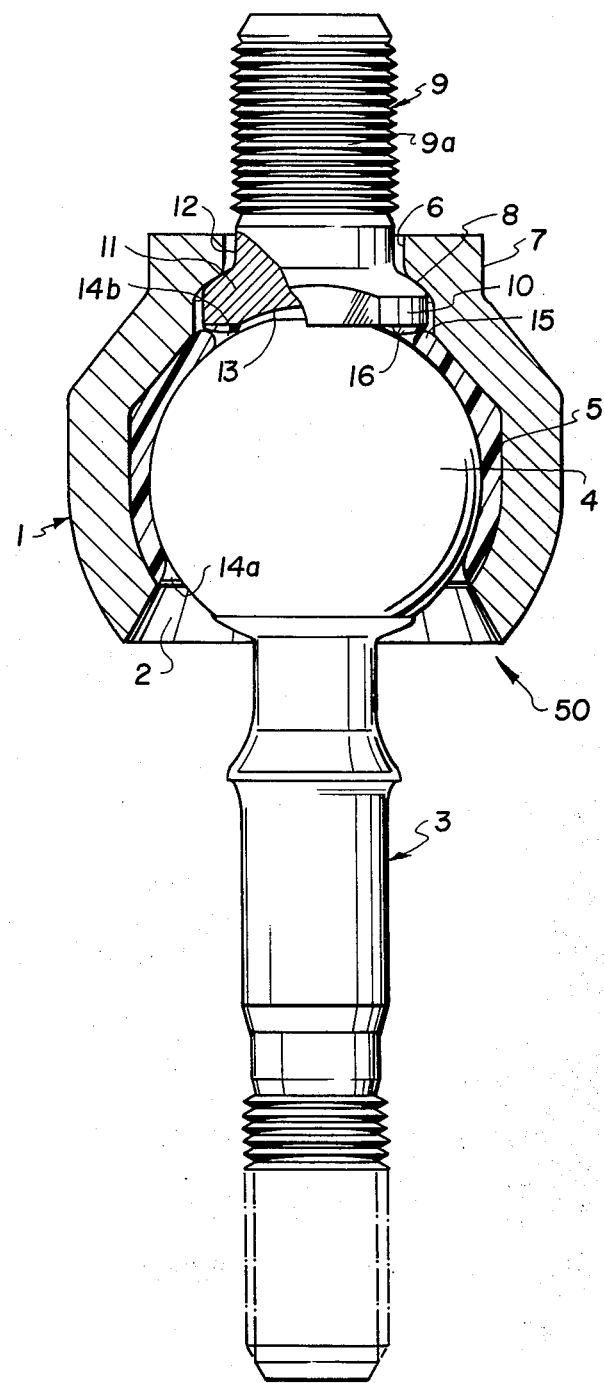

AXIAL BALL AND SOCKET JOINT

BACKGROUND OF THE INVENTION

1. Field of the Invention

The invention relates to universal joint construction and in particular to a new and useful axial ball and socket joint, particularly for steering suspensions of motor vehicles, where a joint pin is mounted with its ball end elastically in a one-part housing which has a first opening for the passage of the ball pin, and another opening opposite the first opening for the passage of a head screw as a connecting member to the rack of a steering device.

2. Description of the Prior Art

In joints of this nature it was found to be of advantage to effect the connection of the ball and socket joint with the rack by means of a head screw which is put through an opening of the joint housing and bolted with the rack. The screw head rests with its bottom plane surface on the corresponding counter-surface of a revolving inner housing shoulder. In this way a very simple connection of a tie rod joint with the rack can be obtained. Due to the separation of the connecting element (head screw) from the joint housing, it is also possible to design the housing with a practically uniform wall thickness, so that it can be produced particularly cheap by extrusion molding.

But the known joint is also disadvantageous insofar as stresses appear when the joint is screwed into the rod, which result from alignment errors and from inaccuracies on the surfaces of the parts to be joined, which were designed heretofore with plane bearing surfaces.

SUMMARY OF THE INVENTION

The invention eliminates the disadvantages of the prior art and achieves additional advantages.

In accordance with the invention a convex segment is provided between the screw head and the screw shaft, which has a corresponding concave segment on the inner wall of the joint housing limiting the outlet opening. This has the effect that, when the joint is screwed into the rack, any existing alignment errors and surface inaccuracies are compensated, and the parts can be joined with each other stress-free.

In accordance with another feature of the invention a calotte-shaped recess is provided on the face of the screw head facing the ball end. Due to this measure, the distance between the screw head and the ball end can be shortened, so that a compact design is achieved.

Other features of the invention include the elastic support of the connecting screw opposite the ball end, and in the configuration of the edge of the opening for the passage of the connecting screw.

Accordingly it is an object of the invention to provide a ball and socket joint particularly for steering suspension of motor vehicles in which a joint housing has a first opening at one end through which a joint pin having a ball head extends and an opposite opening at the opposite end through which a head portion of a connecting screw extends, the connecting screw having a head portion with a spherical surface which slides on a ledge portion opposing the spherical head of the ball and an exterior surface having a concave spherical portion which engages on the ball head.

A further object of the invention is to provide a ball and socket joint which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWING

The only FIGURE of the drawing is a longitudinal sectional view of a ball joint constructed in accordance with the invention.

GENERAL DESCRIPTION OF THE PREFERRED EMBODIMENT

Referring to the drawings in particular the invention embodied therein comprises an axial ball and socket joint generally designated 50 which includes a housing generally designated 1 having a first end with a first opening 2 through which a spherical bore head 4 of a pin joint generally designated 3 extends. The ball head 4 is mounted for universal pivotal movement in a socket or sleeve 5 of elastic plastic material 5 and an end portion of the head is disposed in a spherical recess 13 on the exterior of a screw head 10 of a connecting screw 9 which includes a shank portion 9a connected to the screw head through an intermediate hemispherical portion or convex segment 11. The head screw 9 forms a connecting element to a rack (not shown) of a steering system for motor vehicles. The material for the socket of elastic plastic material 5 comprises an elastic plastic with good sliding properties and having a low frictional value. Joint pin 3 is bolted as usual with a tie rod (not shown).

In accordance with a feature of the invention the housing 1 is provided with an annular rim or edge 7 around the second opening 6. This rim is provided on its inner wall with an inwardly directed ledge or step 8 having a concave surface complementary to the intermediate portion 11 of the head 10. The screw head 10 is advantageously made square and engages a corresponding square opening 6 so that the screw cannot rotate. The screw head rests with its curved segment 10 on the corresponding concave surface 8 of the housing opening. With such a construction any harmful stresses between the joint housing and the connecting screw and any resulting operational troubles are avoided despite alignment errors and machining inaccuracies of the parts.

The screw head 10 has an exterior surface or the surface facing the ball head 4 with the concave recess 13 in which the end face of the ball protrudes so that a shortening of the distance between the screw head and the ball is possible and a compact design of the swivel connection achieved.

In accordance with a further features of the invention the socket of elastic plastic 5 is provided with a first opening 14a through which the ball 4 extends and a second opening 14b which exposes the end of the ball head for engagement into the recess 13 of the head. This makes it possible to introduce the head screw into the housing opening 6 when the joint is assembled. A further feature is that the socket 5 is provided with a limiting edge 15 for the opening 14b which is stepped and terminates in a lip 16 which is directed toward the surface of the ball 4 and which provides a protective cover against the entrance of dirt and dust into this side of the joint.

The sealing of the joint at the opening 2 for the passage of the pin is effected in a known manner such as by a surrounding bellows-like covering between the pin and the housing. The socket edge 16 also provides an elastic support for the head screw arranged within a minimum distance from the ball end so that there will be no rattling of the joint.

While a specific embodiment of the invention has been shown and described in detail to illustrate the application of the principles of the invention, it will be understood that the invention may be embodied otherwise without departing from such principles.

What is claimed is:

1. An axial ball and socket joint particularly for a steering suspension of motor vehicles, comprising a one-piece joint housing having a first end with a first opening therethrough and an opposite end with a second opening therethrough and having an interior partially spherical surface between said first and second openings, a joint pin extending through said first opening and having a spherical ball head portion disposed within said housing, means journalling said ball head for universal pivotal movement in said housing over said spherical surface, said housing having a rim edge around the second opening extending outwardly from said spherical surface with an inturned edge on the interior of the housing adjacent the opening having a partially spherical underface opposite to and spaced from said ball head, a connecting cap screw extending into the interior of said housing through said second opening and having a shank portion fixedly connected to the steering suspension and a head portion larger than said shank portion spaced from said ball head with a spherically curved intermediate segment portion disposed between said head portion and said shank portion and bearing against the spherical underface of said housing, said head portion having an exterior face with a partial concave spherical recess facing said ball head into which said spherical ball head is engageable, whereby said shank portion once fixedly connected to the steering suspension becomes fixed with respect to said joint housing with the engagement between said spherically curved intermediate segment portion and said spherical underface becoming fixed and preventing stresses in the ball and socket joint due to misalignment of said shank and joint pin and inaccuracies in the abutting surface of the ball and socket joint 2. An axial ball and socket joint according to claim 1, wherein said screw head surface facing said ball head has a calotte-shaped recess.

3. An axial ball and socket joint according to claim 1, wherein said means journaling said ball head comprises a socket of elastic plastic material having one end with a first opening adjacent the first opening of said housing and an opposite end with a second opening adjacent the second opening of said housing, the material of said socket bordering said second opening comprising an elastic support engageable with said head and including a sealing lip portion extending toward said ball head.

4. An axial ball and socket joint according to claim 1 wherein said journalling means comprises a sleeve of a lasting material disposed between said ball head and the interior of said housing and having an end facing said connecting screw forming a sealing lip engaged against said head portion of said connecting screw, said connecting screw partial concave spherical recess facing said ball head being spaced away from said ball head to permit rotation of said ball on said journalling means.

* * * * *